US012024941B2

(12) United States Patent
Moschini et al.

(10) Patent No.: US 12,024,941 B2
(45) Date of Patent: Jul. 2, 2024

(54) AUTOMATIC DEVICE AND AUTOMATIC METHOD FOR FILLING THE INSULATING GLAZING UNIT COMPOSED OF AT LEAST TWO GLASS PANES AND AT LEAST ONE SPACER FRAME WITH A GAS OTHER THAN AIR

(71) Applicant: FOREL SPA, Roncade (IT)

(72) Inventors: Dino Moschini, Roncade (IT); Fortunato Vianello, Roncade (IT); Riccardo Vianello, Roncade (IT)

(73) Assignee: Forel Spa, Treviso (IT)

( * ) Notice: Subject to any disclaimer, the term of this patent is extended or adjusted under 35 U.S.C. 154(b) by 175 days.

(21) Appl. No.: 16/636,002

(22) PCT Filed: Jul. 26, 2018

(86) PCT No.: PCT/EP2018/070308
§ 371 (c)(1),
(2) Date: Feb. 1, 2020

(87) PCT Pub. No.: WO2019/025283
PCT Pub. Date: Feb. 7, 2019

(65) Prior Publication Data
US 2021/0140229 A1 May 13, 2021

(30) Foreign Application Priority Data

Aug. 2, 2017 (IT) .................. 102017000089359

(51) Int. Cl.
*E06B 3/673* (2006.01)
*C03C 27/06* (2006.01)
(Continued)

(52) U.S. Cl.
CPC .......... *E06B 3/67386* (2013.01); *C03C 27/06* (2013.01); *E06B 3/66366* (2013.01);
(Continued)

(58) Field of Classification Search
CPC .. C03C 27/06; E06B 3/67386; E06B 3/66366
See application file for complete search history.

(56) References Cited

U.S. PATENT DOCUMENTS

2009/0205743 A1  8/2009  Vianello
2015/0184447 A1  7/2015  Queck et al.

FOREIGN PATENT DOCUMENTS

CN   102959172     3/2013
CN   203097619 U   7/2013
(Continued)

OTHER PUBLICATIONS

International Search Report issued for PCT/EP2018/070308, mailed Oct. 15, 2018.

*Primary Examiner* — Zachary M Davis
(74) *Attorney, Agent, or Firm* — Thomas | Horstemeyer, LLP

(57) ABSTRACT

An automatic device and an automatic method for filling with gas other than air the insulating glazing unit composed of at least two glass panes and at least one spacer frame. The device comprises mechanisms for flattening the glass panes when they are not sufficiently flat, for example in the case of laminated or tempered panes. This allows to perform in an optimum manner the filling with gas and to process insulating glazing units with special spacer frames.

7 Claims, 17 Drawing Sheets

(51) Int. Cl.
  *E06B 3/663*    (2006.01)
  *E06B 3/677*    (2006.01)
  *E06B 3/66*     (2006.01)

(52) U.S. Cl.
  CPC ........ *E06B 3/67326* (2013.01); *E06B 3/6775* (2013.01); *E06B 3/6617* (2013.01)

(56) References Cited

FOREIGN PATENT DOCUMENTS

| | | |
|---|---|---|
| CN | 106467366 | 3/2017 |
| DE | 4315986 | 11/1994 |
| DE | 4315986 A1 | 11/1994 |
| EP | 2093370 | 8/2009 |
| EP | 2093370 A2 | 8/2009 |
| EP | 3133234 A1 | 2/2017 |
| WO | 2016170079 | 10/2016 |
| WO | 2016170079 A1 | 10/2016 |
| WO | 2016174268 A1 | 11/2016 |

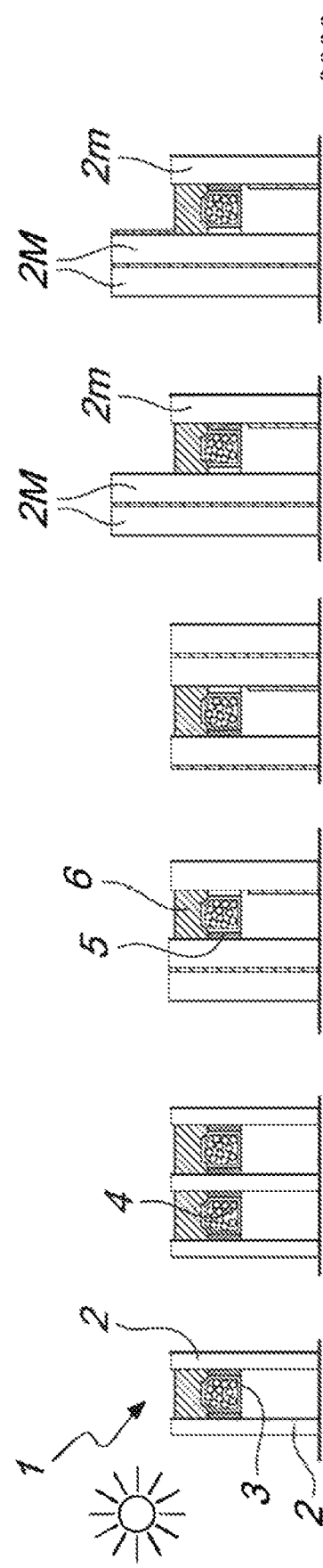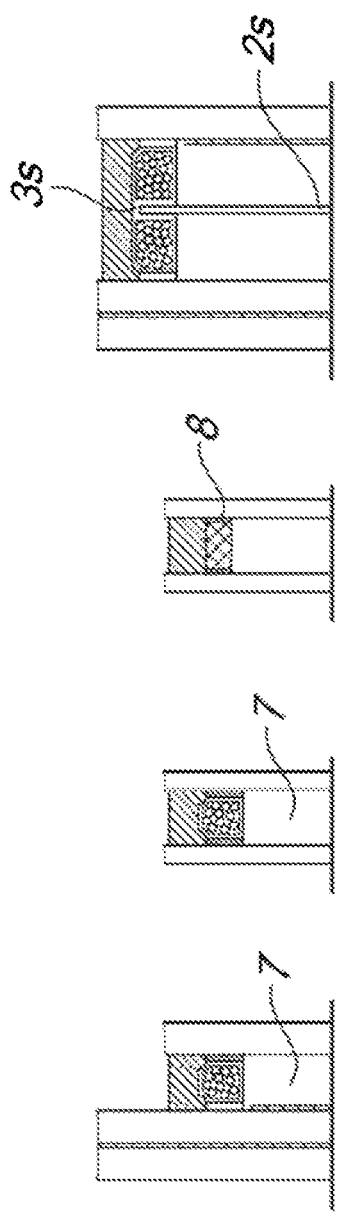

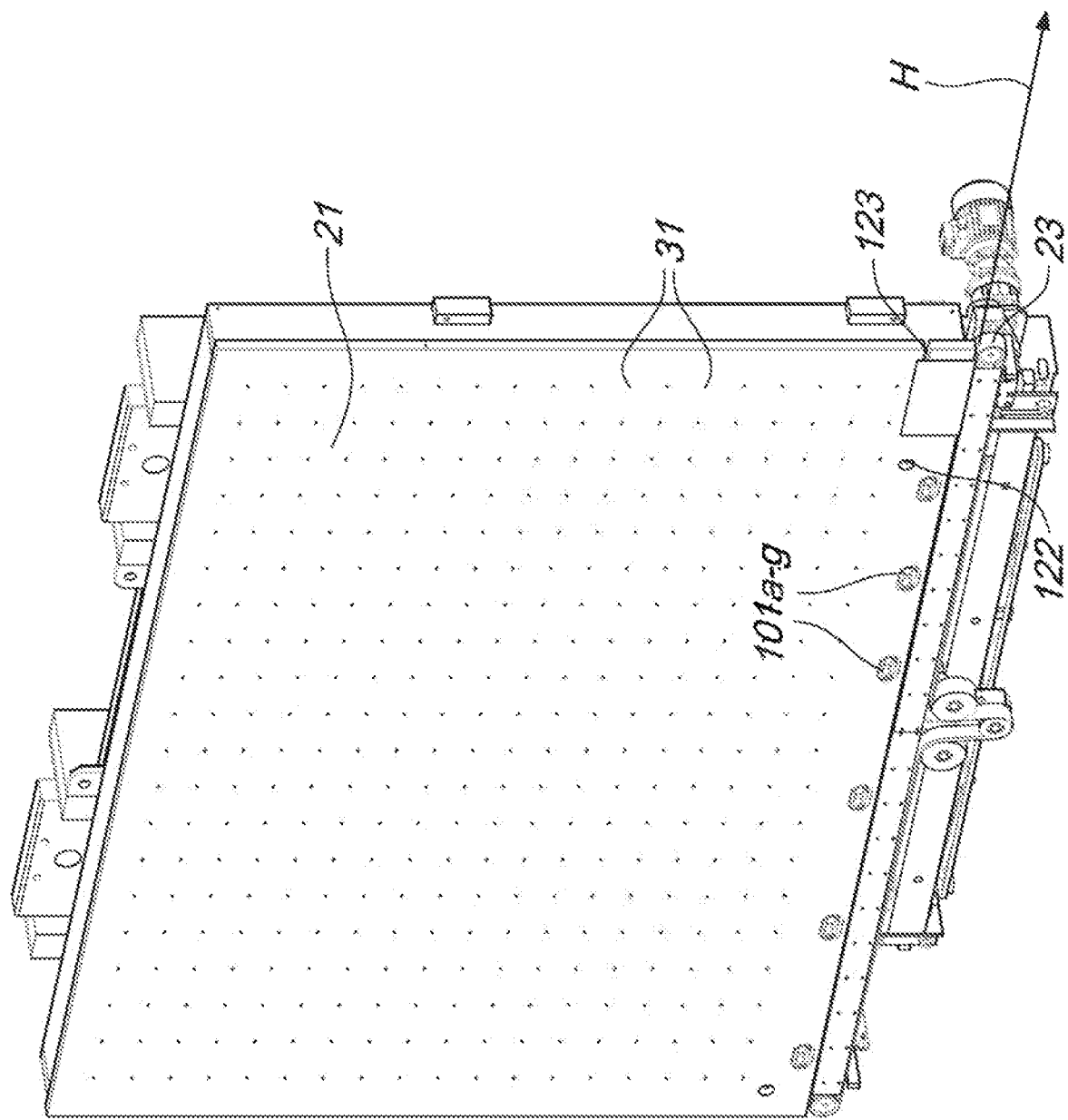

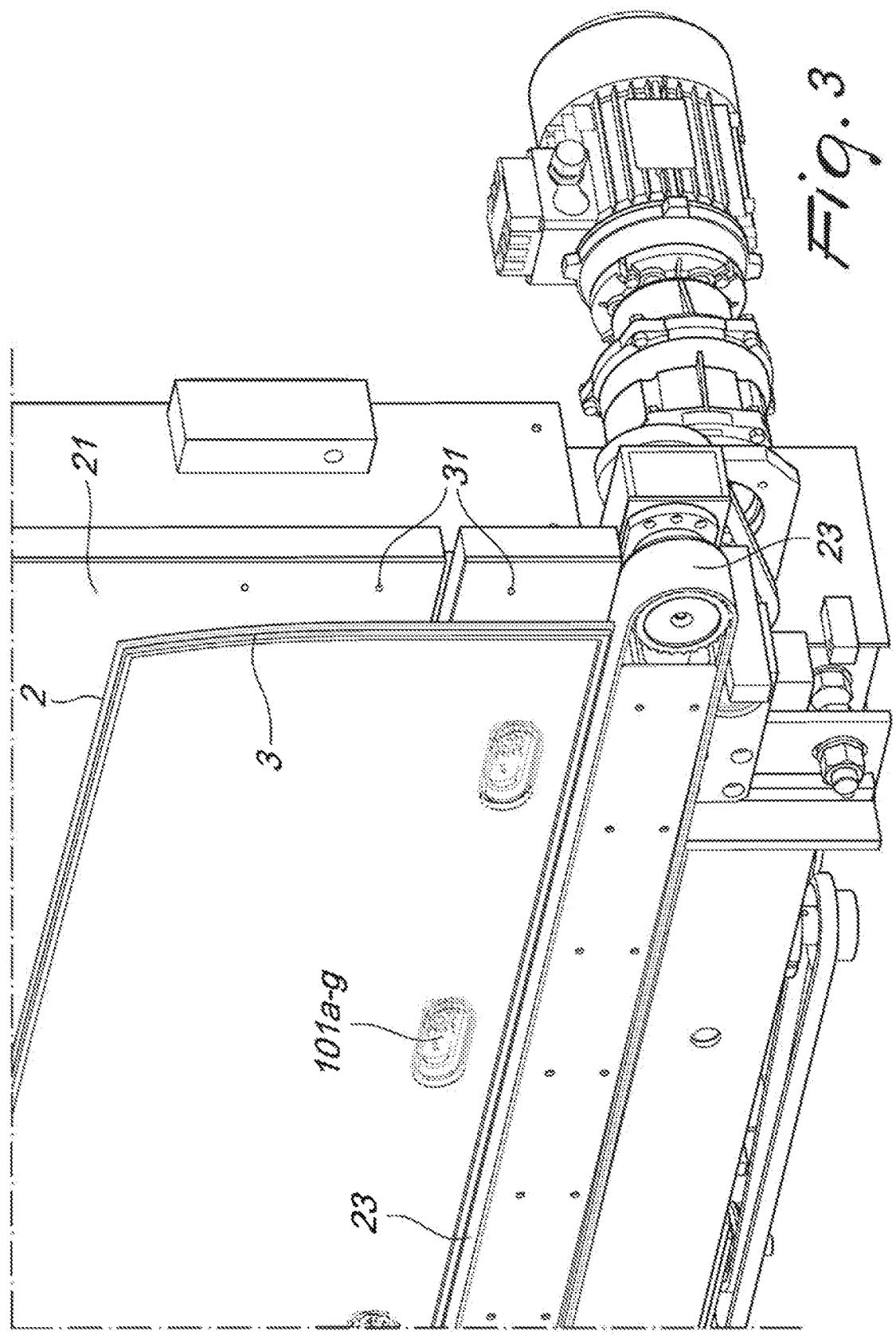

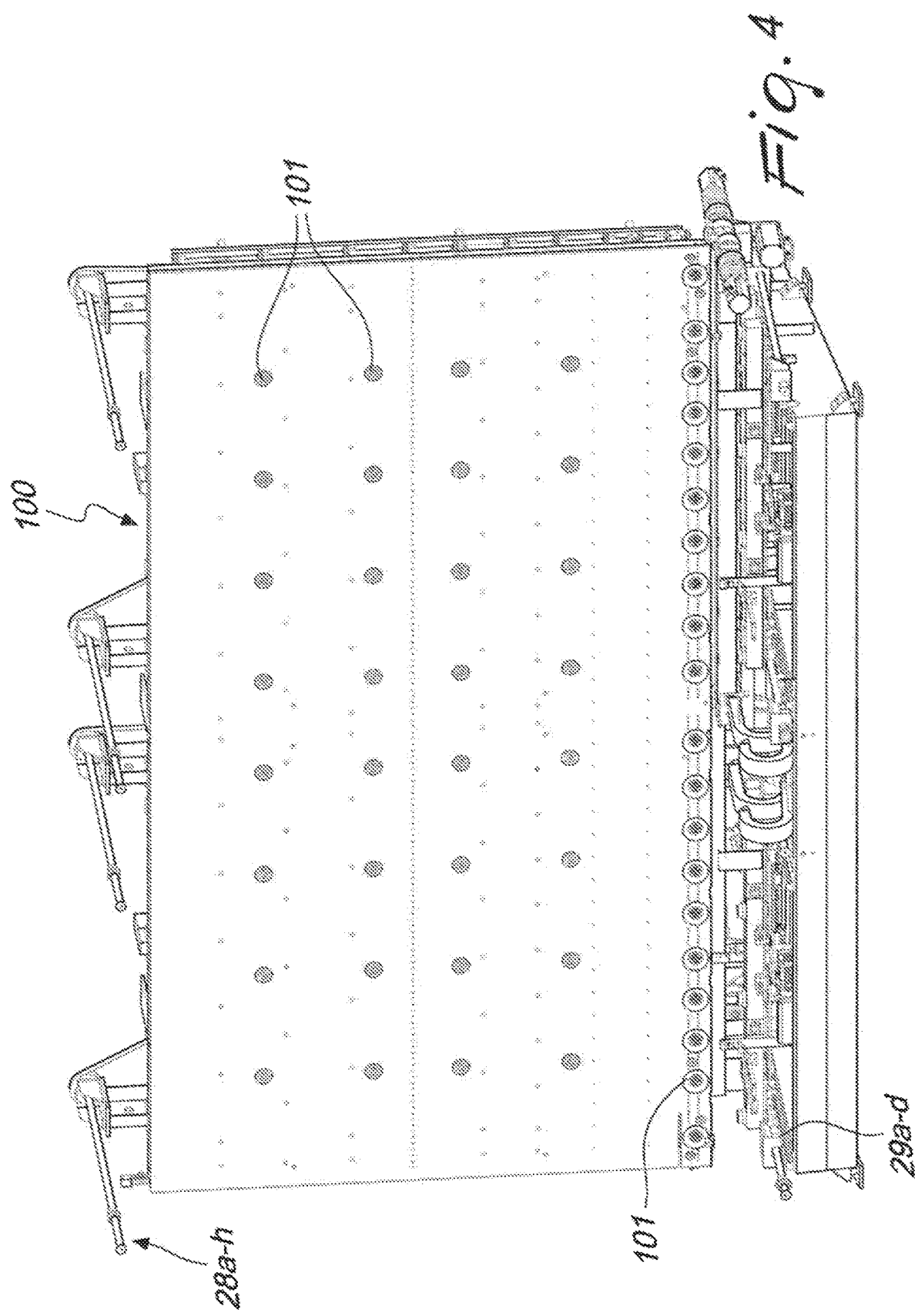

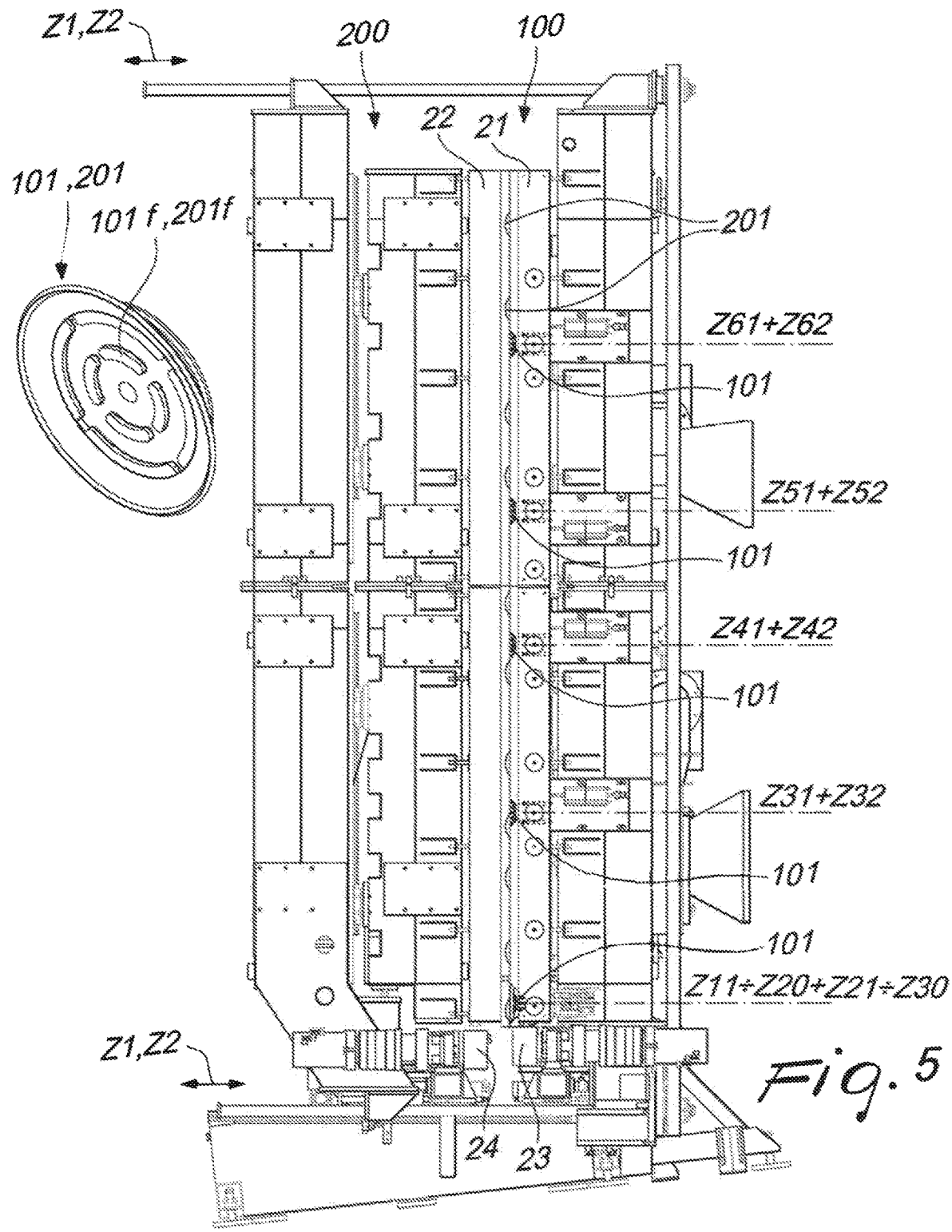

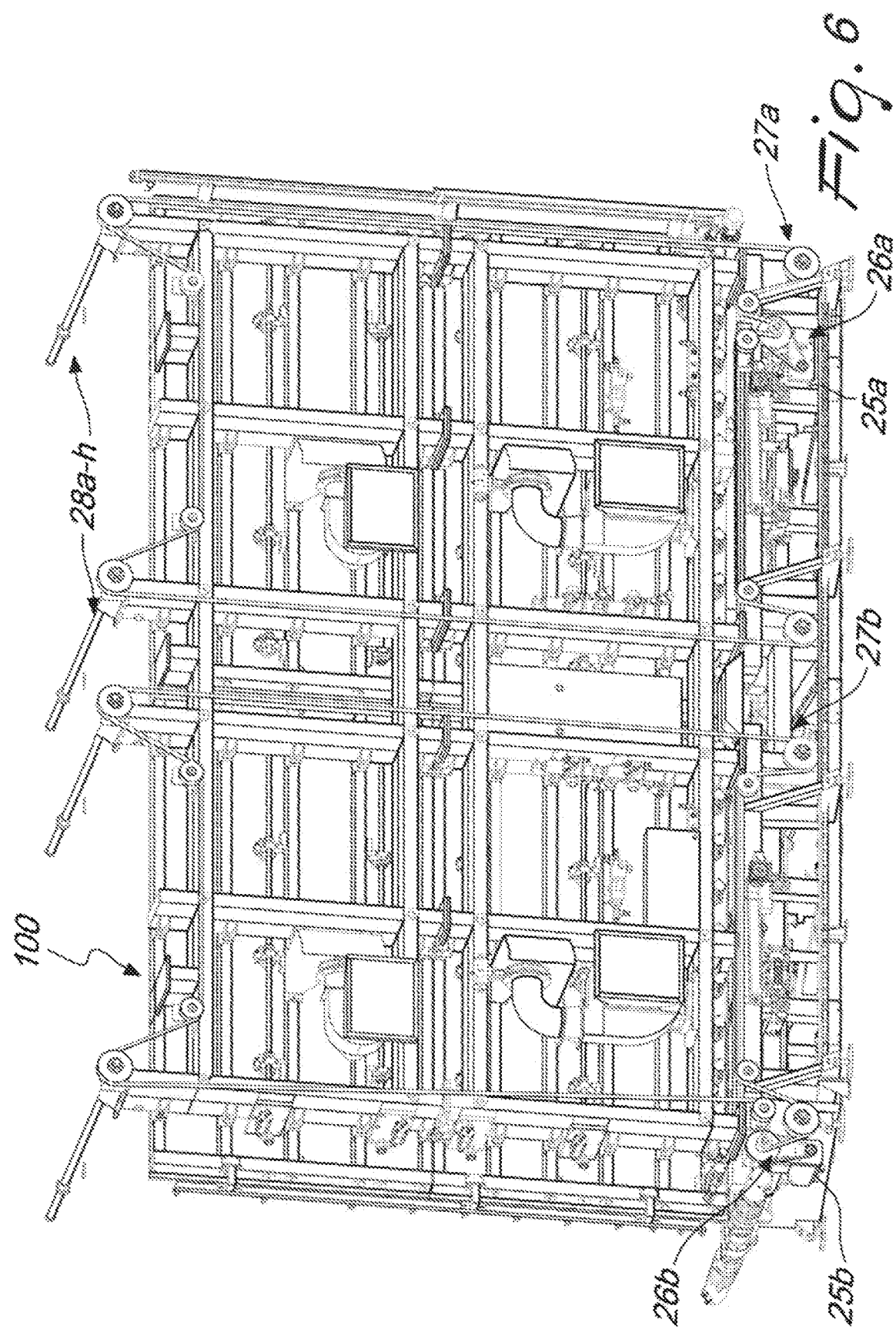

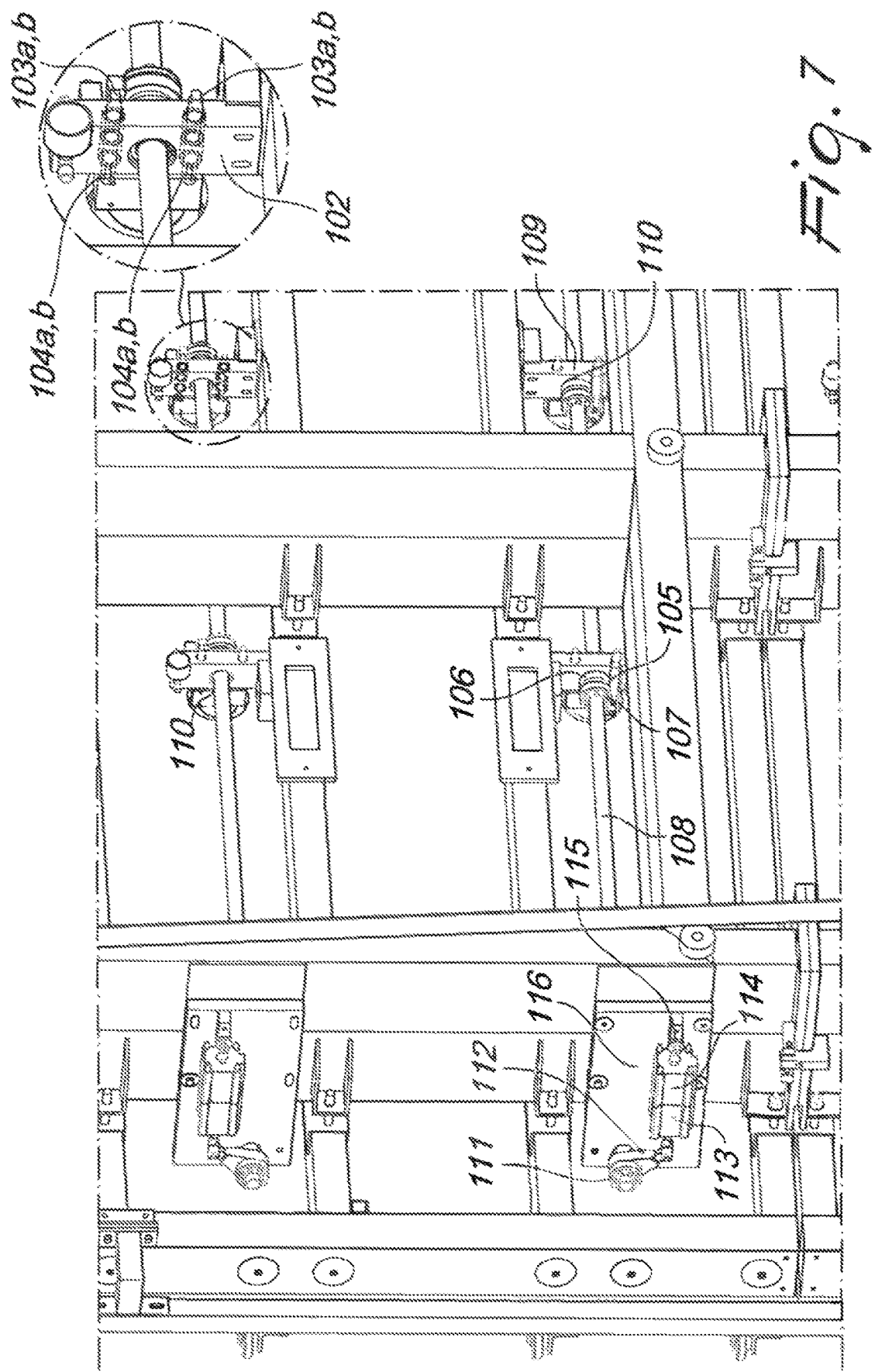

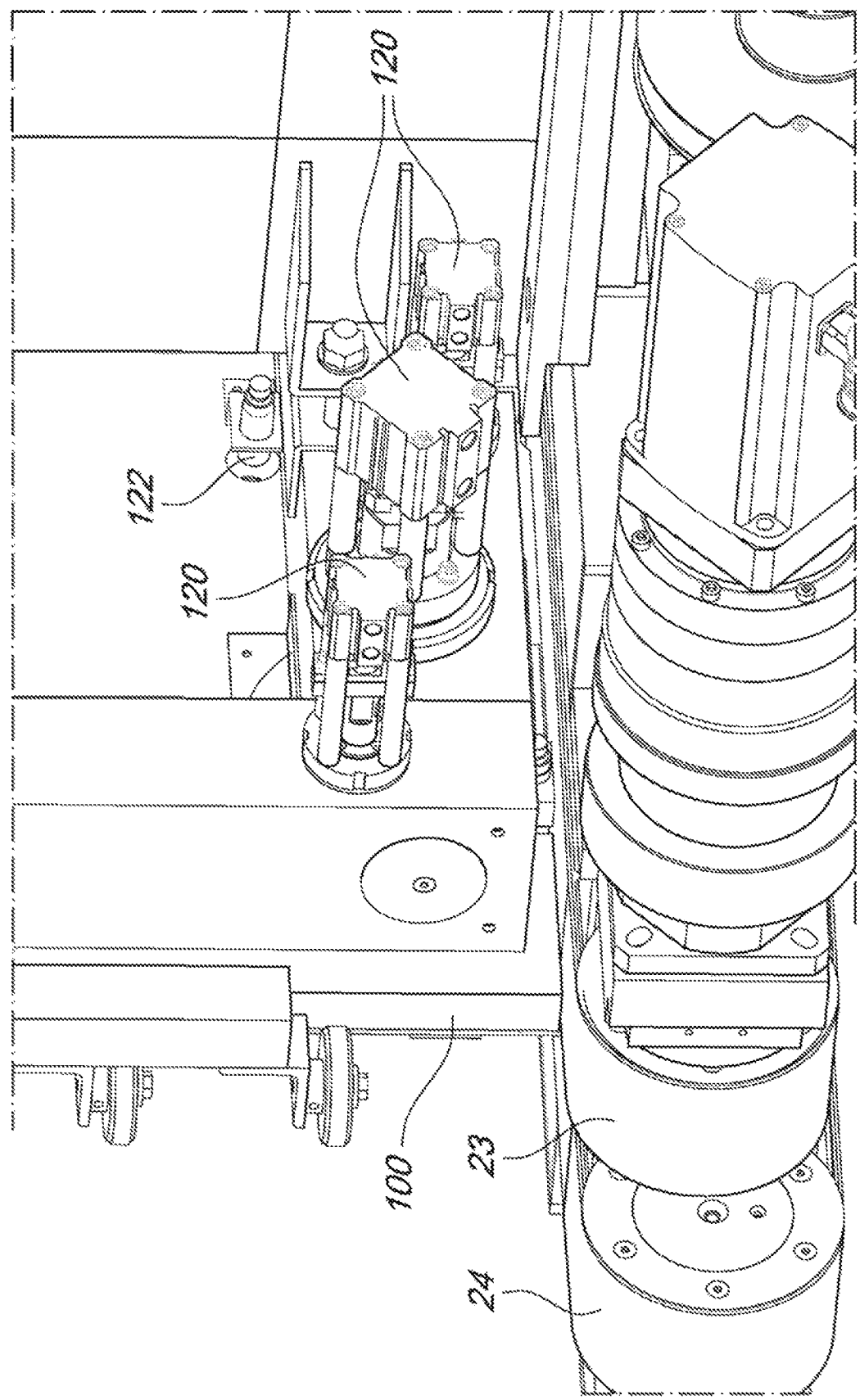

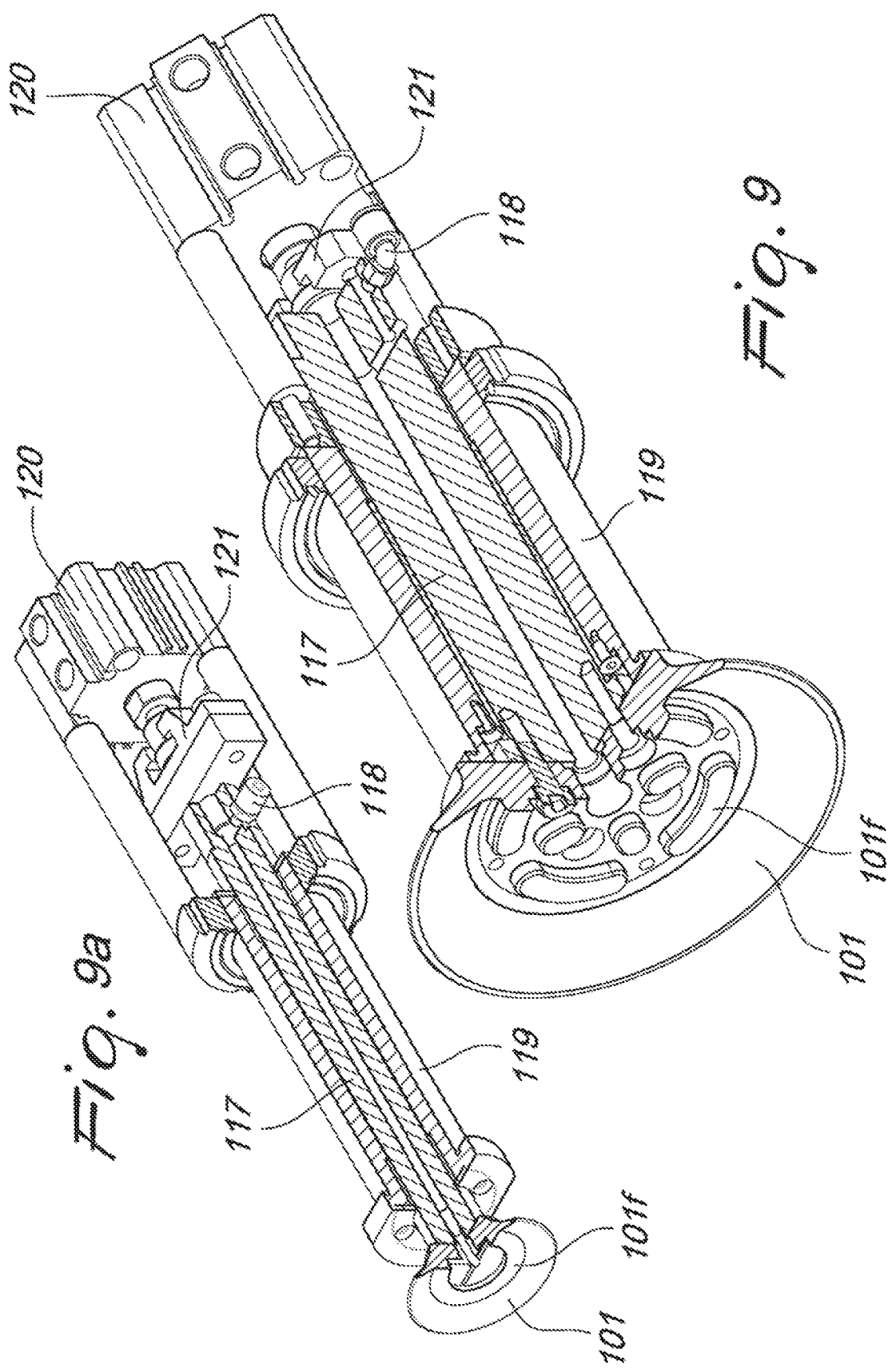

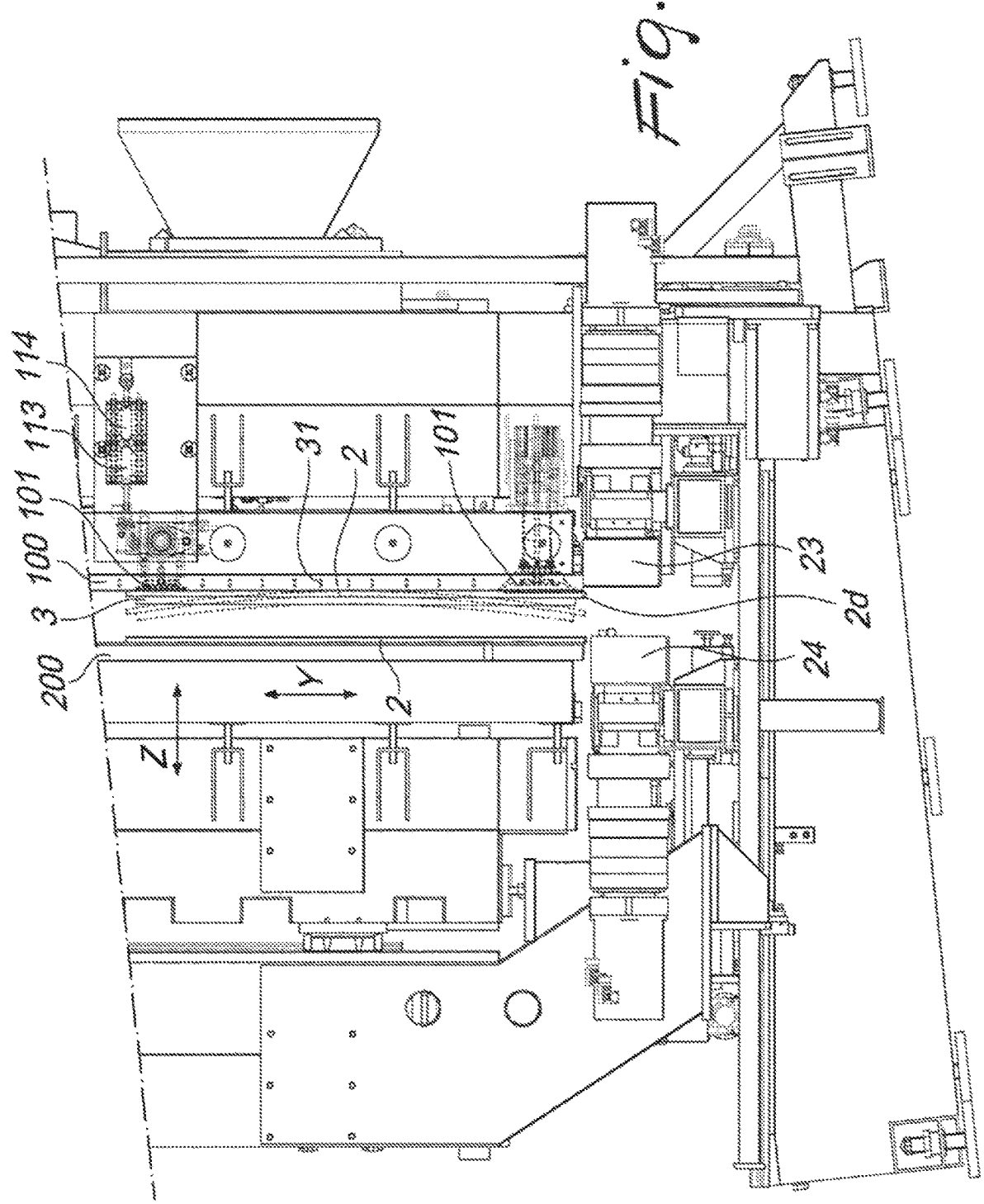

AUTOMATIC DEVICE AND AUTOMATIC METHOD FOR FILLING THE INSULATING GLAZING UNIT COMPOSED OF AT LEAST TWO GLASS PANES AND AT LEAST ONE SPACER FRAME WITH A GAS OTHER THAN AIR

CROSS-REFERENCE TO RELATED APPLICATIONS

This application is the 35 U.S.C. § 371 national stage application of PCT application no. PCT/EP2018/070308, filed Jul. 26, 2018, where the PCT claims priority to, and the benefit of, Italian application no. 102017000089359, filed Aug. 2, 2017, both of which are herein incorporated by reference in their entireties.

FIELD OF APPLICATION

The field of application is the one according to the preamble of Claim 1.

BACKGROUND ART

Currently it is known to lay the spacer frame or the spacer profile on a glass pane and then to couple the assembly to an additional glass pane and seal it along the entire external peripheral region so as to constitute the so-called insulating glazing unit or insulating glass frame. The operation can also be multiple, in order to obtain the insulating glazing unit constituted by three panes and two spacer frames or profiles, as well as n panes and n−1 spacer frames or profiles. The operation can also relate to glass panes having different dimensions despite belonging to the same insulating glazing unit, so as to obtain an offset between the edges of said panes, which is necessary in order to mate with a particular type of door or window, i.e., the one that constitutes so-called continuous glazing or so-called structural glazing.

The spacer frame or more appropriately the profile that constitutes it often has a hollow rectangular transverse cross-section and is coated, on its sides that adhere to the glass panes, with a butyl sealant; it is furthermore generally beveled toward the outside of the insulating glass frame in order to accommodate a larger quantity of sealant. It can be also constituted by a continuous profile made of expanded synthetic material which is coated, on its sides, with an acrylic adhesive and optionally with a butyl sealant.

Moreover, for both of these types of spacer profile and frame, solutions have recently become commercially available in which their shape includes one or more grooves for retaining one or more intermediate glass panes or one or more ornamental grilles, so that the insulating glazing unit comprises multiple inner spaces. In this situation, the frame is assembled around the one or more intermediate glass panes or ornamental grilles either manually or by machines, which are generally robotized and are external to the automatic line for the production of the insulating glazing unit and the assembly is sent to the automatic line for the production of the insulating glazing unit as a component thereof.

Currently it is increasingly widespread to replace the air contained in the volume formed by the glass panes and by the spacer frame, a volume known as inner space, with a gas which has more effective thermal insulation characteristics and optionally acoustic insulation characteristics than air. This is increasingly current in view of the requirements of technical regulations related to energy saving and soundproofing, and the present invention therefore is adapted to solve some aspects related to both procedure and device which are lacking according to the background art, albeit advanced, available so far.

In order to better understand the configuration of the insulating glazing unit in the combination of its components, such as the glass panes and the spacer frame or spacer profile, some concepts related to these semi-finished or intermediate components, i.e., the glass pane 2 and the spacer frame or profile 3, and the final product itself, i.e., the insulating glazing unit 1, are described more extensively hereinafter, with the assumption that the subsequent use of the insulating glazing unit, i.e., as a component of the door or window or of continuous faces or of structural faces, is known.

The insulating glazing unit 1 is constituted by the composition of two or more glass panes 2 separated by one or more spacer frames 3, which are generally hollow and microperforated on the face directed inward, the spacer frames containing, in their hollow part, hygroscopic material 4 and being provided with a butyl sealant 5 on the lateral faces (which constitutes the so-called first seal) and the inner space (spaces) delimited by the glass panes 2 and by the spacer frame (frames) 3 may containing air or gas 7 or mixtures of gases 7 other than air which give the insulating glass frame particular properties, for example thermal insulation and/or soundproofing properties. The use of a spacer profile 3 having an essentially rectangular cross-section, made of expanded synthetic material (by way of nonlimiting example: silicone and EPDM), which embeds the hygroscopic material 4 in its mass, has also become widespread recently.

The joining between the glass panes 2 and the spacer frame (frames) 3 is achieved by means of two levels of sealing, the first one 5 having the function of providing a hermetic condition and the initial bonding between said components and affecting the lateral surfaces of the frame and the portions of the adjacent glazing units, already mentioned earlier, the second one 6 having the function of providing final cohesion among the components and mechanical strength of the joint between them and affecting the compartment constituted by the outer curved surface of the spacer frame 3 and by the faces of the glass panes 2 up to the edge thereof (see FIGS. 1A-1J). In the case of a spacer profile 3 made of expanded synthetic material, the first sealing level 5 is replaced or integrated with an adhesive 8, for example an acrylic one, already spread on the lateral faces of said spacer profile 3 and covered with a removable protective film, which is thus removed when used.

The glass panes 2 used in the composition of the insulating glazing unit 1 can have different shapes according to their use; for example, the external glass pane (external meant with respect to the building) can be normal or reflective or selective (in order to limit the heat input during summer months) or layered (also known as laminated, constituted by two or more glass panes which are intimately connected by one or more membranes made of PVB=polyvinyl butyral) or armored (for intrusion prevention/vandalism prevention functions) or combined, for example laminated and tempered (for security functions)/reflective and laminated (in order to obtain a combination of properties); the internal glass pane (internal meant with respect to the building) can be normal or with low emissivity (in order to limit the dispersion of heat during winter months) or laminated and tempered (for security functions) or combined (for example low-emissivity and laminated in order to obtain a combination of properties). In particular, the external glass pane 2M can be larger than the internal one (ones) 2m for the entire extension of the perimeter or only on one side or on some sides (see FIGS. 1E-1G).

Among the types of glazing unit mentioned, the so-called laminated, armored (armored=more massive version of laminated ones since it uses glass panes and PVB membranes with greater thicknesses and in larger quantity, so as to constitute multilayer elements of at least three glass panes and at least two interposed PVB layers) and tempered ones, have the characteristic, or rather the defect, of not being sufficiently flat, and this makes it difficult, precarious and sometimes impossible to fill them with gas at least according to known methods, although these methods already resort to multiple refinements and devices.

From the above simple summary, it is already evident that a manufacturing line, in order to obtain the insulating glazing unit product 1, requires many processes in sequence and in particular comprises filling with a gas other than air, which the present application addresses in detail, in particular in order to solve the problem of the non-flatness of the glass panes 2 that constitute the insulating glazing unit 1.

The processes for the production of the insulating glazing unit 1, each requiring a corresponding and particular machine to be arranged in series with respect to the other complementary ones, are well-known both to the person skilled in the art and to the user who is less qualified but however involved in the field, and therefore only the following step is dwelt upon hereinafter:

FILLING WITH GAS, MATING AND PRESSING of the assembly constituted by the glass panes 2 and the frame (frames) 3, since it is involved in the present invention and is improved by the present invention.

The most widespread solutions for replacing air with a gas which has superior properties is to perform the process during the step for mating the glass panes 2 and the spacer frame 3 or spacer frames 3 (in the case of insulating glazing units with multiple inner spaces); this occurs, as is known, in the machine commonly known as "mating press with gas filling": this machine is essentially constituted by two planes with an arrangement that is slightly inclined with respect to the vertical, of which one is fixed and aligned with the input conveyors for the conveyance of the glass panes 2 and with the output conveyors of the insulating glazing unit 1 and one is movable along a direction Z which is perpendicular to said planes; the movable plane, provided with a formation of suckers which are distributed over the entire plane, approaches the fixed one, where the first glass pane 2 had been arranged beforehand until it rests, even forcefully so as to straighten it, against said glass pane 2 and captures it by means of the activated formations of suckers; then said movable plane moves away from the fixed plane and the first glass pane 2 moves with it until it clears a space equal to the space occupation of the second glass pane 2 which includes the spacer frame 3, which adheres to said glass pane by virtue of the first butyl sealant 5 and/or the acrylic adhesive 8 or both, plus, in the step for gas injection, the amount of a gap designed for gas inflow; like the second glass pane 2 provided indeed with a spacer frame 3 is arranged by means of the conveyors on the fixed plane, adequate known mechanisms move closer the manifold, which optionally can be throttled in the direction of length in order to adapt to the length of the insulating glazing unit, for the introduction of the gas at the base of the elements that constitute the insulating glazing unit 1 and other likewise known mechanisms provide one or two vertical sealing barriers at the sides of the elements that constitute the insulating glazing unit 1, albeit with a shape other than rectangular; then the gas is injected; then the movable plane closes toward the fixed plane, providing the mating of the glass panes 2 and of the spacer frame 3 and the simultaneous pressing; in this manner, the gas 7 remains trapped inside the insulating glazing unit 1; then the evacuation of the insulating glazing unit 1 that contains the gas other than air begins.

In the case of an insulating glazing unit 1 constituted by more than two glass panes 2 (typically three) and more than one spacer frame 3 (typically two), the machine, before evacuating the insulating glazing unit 1 as composed in the steps described above, i.e., by two glass panes and one spacer frame, performs an additional cycle, i.e., the movable plane reopens as mentioned above, capturing said insulating glazing unit 1, waits for the placement of a third glass pane 2 provided with a second spacer frame 3, moves toward it as mentioned above and, after the introduction of the gas, performs a second mating and a second pressing; the method can be repeated in the case of a quadruple glazing unit, etc.

The search for patent prior art filed in the same field and describing machines and methods for filling an insulating glazing unit 1 with a gas other than air according to the above, despite leading to numerous inventions, does not lead to a solution for correct filling with gas in the case of glass panes 2 that are not sufficiently flat; this aspect of the non-flatness of the glass panes 2 is therefore one of the main problems that currently exist in commercially available machines, since it compromises the results in terms of concentration of the gas contained in the insulating glazing unit 1 and of gas consumption. While inexpensive argon gas was used predominantly in the past, today, in order to reach much better performing thermal and acoustic insulations, more expensive gases, such as krypton and xenon, are used and therefore one cannot afford to waste the gas during the filling step (if one assumes the cost of argon to be 1, krypton and xenon cost 100 and 400 respectively).

The method of filling with the cited gases, which are all denser than air, requires the gas to be injected in laminar conditions in order to limit mixing with the air contained in the inner space, along the lower gap left between the first glass pane and the second glass pane provided with a spacer frame, and at the same time requires that the air contained in the inner space has a vent through the corresponding upper gap. As regards the lateral gaps, either sealing elements are moved closer on at least one of the two vertical sides, or an outflow of gas and air through them is accepted. Moreover, it is important that said perimetric gap is limited for two reasons: a) to have a load loss, so that the introduction of the gas is distributed uniformly along the entire base; b) to limit the consumption of gas, since the additional inner space that corresponds to the area of the surface of the glass pane multiplied by the value of said gap entails an additional volume of gas that is not used for its function in the insulated glazing unit but is expelled during the subsequent step of mating and pressing of the glass pane 2—spacer frame 3 assembly.

It goes without saying that if one or both of the glass panes are not flat, the upper gap might be reduced in its extent or even eliminated, and therefore the venting of the air to be expelled does not occur and accordingly filling with gas is not effective.

Research in the background art, moreover in a very crowded field, has led to many patent titles of which the most pertinent, in the name of the same applicant FOREL SPA, is mentioned since it already performs the global straightening of the first glass pane and the straightening of the base of the second glass pane provided with a spacer frame, which therefore already performs at least a correct method of injection of the gas at the base of the elements that constitute the insulating glazing unit 1, since it has an inlet gap which is uniform along its entire longitudinal extension.

However, even this prior art suffers from a highly critical limitation, since the effectiveness of the straightening on the base line is lost for heavy glass panes, since the base edge itself cannot slide over the underlying conveyance means transversely with respect to the planes. Moreover, as mentioned earlier, tempered and laminated glass panes, which recently have become so widespread, are indeed the ones that require flattening, but due to their shape they increasingly often entail high thicknesses and multiple thicknesses and therefore a great weight, to the point that the formation of suckers devised to straighten the base line is unable to bear this weight, which is instead discharged onto the underlying conveyance means, making it impossible to perform transverse sliding on said conveyance means, which are typically constituted by conveyor belts.

Reference is made to EP 2 093 370 B1, based on Italian priority 1 387 910 dated 20 Feb. 2008 and to corresponding U.S. Pat. No. 8,522,831 B2 for the detailed description of the devices for the conveyance of the glass panes and of the manifolds for injecting the gas.

The background art available from this and numerous equally pertinent, albeit very recent, inventions such as at least WO2016/174268 A1 of LISTEC AUSTRIA GmbH based on German priority dated 30 Apr. 2015 and EP 3 133 234 A1 by Bystronic Lenhardt GmbH based on German priorities dated 21 Aug. 2015 and 5 Nov. 2015, teaches nothing as regards how to solve the problem of non-flat and heavy glass panes, which currently are increasingly widespread in view of the intensive use of laminated and tempered glass panes for the uses mentioned in the introduction.

The aim of the present invention is therefore to provide an automatic device and an automatic method that allow the filling of the insulating glazing unit with a gas other than air even if one or more of the glass panes 2 do not have a sufficiently precise flatness and in some cases even have a considerable weight.

This is achieved mainly by providing the entire fixed plane with formations of suckers, not of the type of the known ones that are on the movable plane, but retractable ones which comprise servomechanisms adapted to render the process functional and reliable regardless of the dimensions of the glass panes, by virtue of the placement of said retractable suckers and the manner of their movement.

Moreover, and this leads to the inventive unity of the two independent claims, the achievement of flatness of the glass panes is indeed also the source of an important linked advantage, i.e., to allow the use of special spacer frames such as the ones described in the introduction, provided with one or more grooves on which one or more intermediate glass panes or ornamental grilles are retained, said frames being thus automatically insertable in the press body between the panes indeed because they are respectively retained and flattened precisely against the fixed plane and against the movable plane, i.e., since the end panes define an internal geometry that is uniform in terms of distance between said panes, and said distance is adjustable in the direction of the thicknesses, by virtue of the known mechatronic mechanisms that control the movement of the movable plane transversely to the fixed plane.

Currently, the diffusion of glass panes which are layered (also termed laminated), tempered, layered and composed of panes of which at least one is tempered, used for the functions described in the introduction, is an important aspect, such as to require that the machines intended for their processing also adapt to their constantly evolving composition. In particular, since non-flatness is meticulously classified by appropriate standards, such as the US standards ASTM C1036-11 for flat glass panes, ASTM C 1048-12 for tempered glass panes, ASTM C 1172-14 for laminated plastic panes, it must constitute a data entry toward the machinery and said machinery must be equipped with devices that make these defects irrelevant since they are solved by means of these predominantly mechatronic devices.

Thus, the irrelevance of the imprecise geometry of the glass panes with respect to the process for filling with gas and to the need to introduce special spacer frames can only be achieved by flattening non-flat glasses panes, especially since the user who purchases the machine reasonably expects it to be able and to be required to process glass panes as they are available commercially and since the manufacturer of said glass panes cannot be contested if the flatness errors fall within the rather permissive standards, for example the listed ones or other similar ones.

DESCRIPTION OF THE INVENTION

The summary description of the drawings and the detailed description of an embodiment of the invention will clarify how the invention according to the present application can be embodied.

DESCRIPTION OF THE FIGURES

FIGS. 1a-1J are schematic views of the peripheral portion of the insulating glazing unit 1 in a non-exhaustive exemplifying series of possible combinations (the inside/outside orientation is identified visually with icons that represent the sun (outer side) and the radiator (inner side)):

FIG. 1A normal;

FIG. 1B triple glazing;

FIG. 1C laminated external pane, low-emissivity internal pane, i.e., reflecting infrared radiation;

FIG. 1D reflective tempered external pane, low-emissivity laminated internal pane;

FIG. 1E offset laminated external pane, low-emissivity internal pane (protruding part not treated with spatula), FIG. 1F offset laminated external pane, low-emissivity internal pane (protruding part treated with spatula);

FIG. 1G like FIG. 1E but with a selective external pane and with the indication of the containment of gas 7;

FIG. 1H like FIG. 1A but with the indication of the containment of gas 7;

FIG. 1I like FIG. 1A but with a spacer profile made of expanded synthetic material which is coupled laterally to the glass panes by means of adhesive 8;

FIG. 1J particular case of a spacer frame 3s which has a special shape in order to accommodate one or more intermediate glass panes 2s or one or more ornamental grilles.

FIGS. 1A-1H and 1J show the spacer frame 3 in its hollow transverse cross-section filled with hygroscopic material 4. The two types of sealant used are highlighted: in black, the butyl sealant 5 (first seal), which has the function of initial bond among the components and of seal both with respect to the entry of humidity and with respect to the outflow of the gas other than air, applied between the lateral surfaces of the spacer frame 3 and the glass panes 2, in dashes the polysulfide or polyurethane or silicone sealant 6 (second seal), which has a mechanical strength function and sometimes, as a function of the type of sealant, also the function of a seal both with respect to the inflow of humidity and with respect to the outflow of the gas other than air, applied between the external curved surface of the spacer frame 3 and the faces of the glass panes 2 up to the edge of the glass panes 2 or to the edge of the glass pane 2m that has the smallest dimensions.

Figure 11:
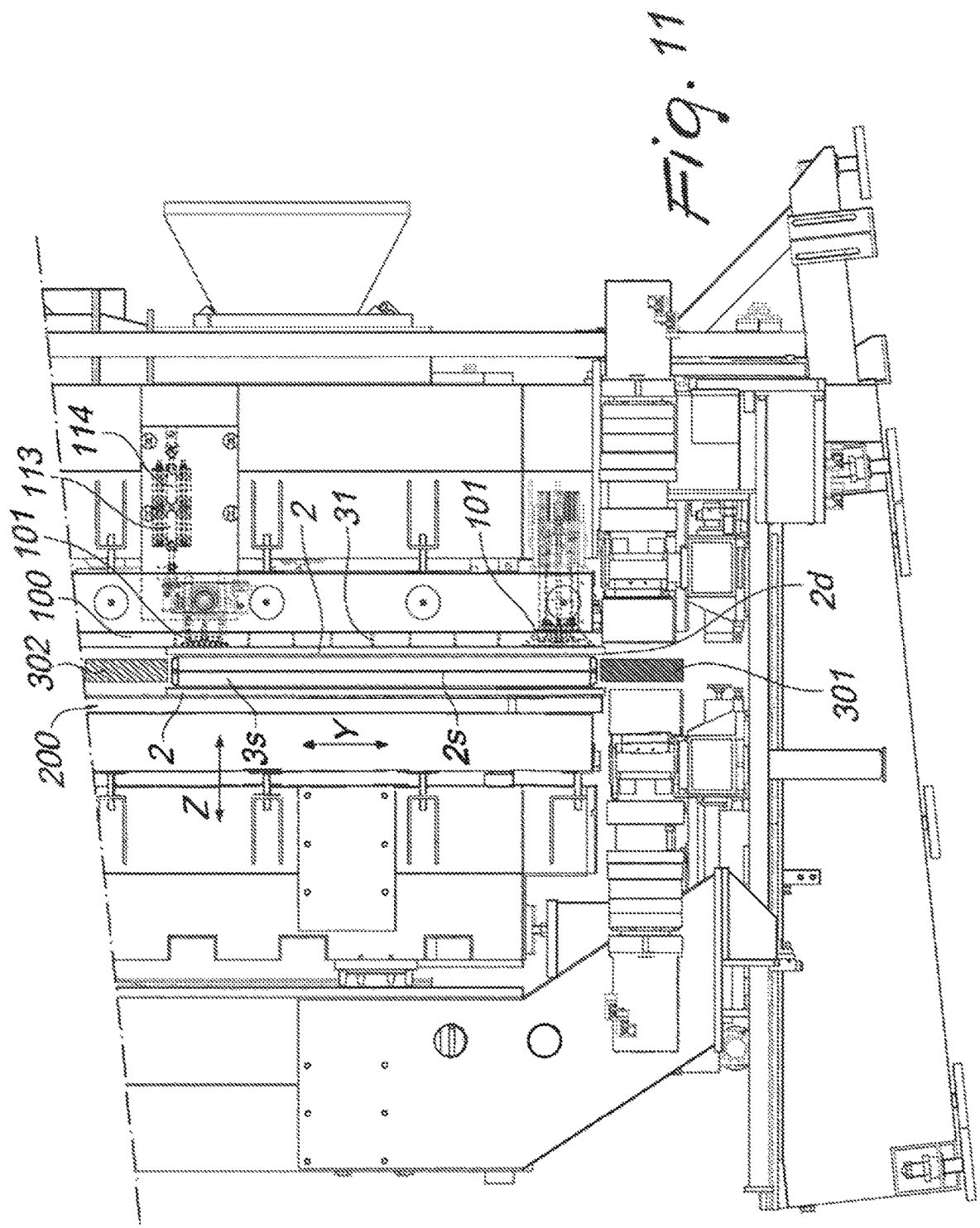

In the situations of FIGS. 1C, 1D, 1E, 1F, 1G, 1J, since the glass panes 2 are insufficiently flat due to their type, the present invention constitutes the solution for correct filling with the gas other than air, where the background art is instead lacking, and also constitutes the solution for the composition of the insulated glazing unit 1 in which the spacer frame is of a special type 3s such as the one described in the introduction.

From these figures it is clear that the insulating glazing unit 1 can have multiple shapes and that the machines for the insertion of the gas, in addition to well filling with gas other than air insulating glazing units that are not perfectly flat, must also work with insulating glazing units composed with any type of spacer frame 3, in particular a composite spacer frame 3s, such as the case of FIG. 1J, and mate with the shape of the edge, as in the cases of FIGS. 1E-1G.

FIG. 2 is a view of the fixed plane 21 of the mating device/press/gas filler in its front perspective view, which includes the formation of the suckers 101a-g, according to the most pertinent background art (EP 2 093 370 B1).

FIG. 3 is a view of a detail of FIG. 2, again in a perspective view, with the simulation of the straightening effect performed by the formation of suckers 101a-g on the lower edge of the glass pane 2, i.e., again referred to the background art, which however does not solve the problem of glass panes the non-flatness of which affects the entire surface.

FIG. 4 is a front perspective view of the rear fixed plane 21, which is redesignated here by the numeral 100 in the inventive solution according to the present invention.

FIG. 5 is a side view of the machine according to the present invention, with the indication of the main components (fixed plane 21, redesignated here by the numeral 100, and movable plane 22, redesignated here by the numeral 200, conveyor belts 23, 24, formations of retractable suckers 101) and of the transverse axes Z (Z1, Z2) for the movement of the movable plane 200 and of the transverse axes Z (Z11÷Z62) for the movement of the various sucker sectors. Preservation of the reference numerals 21-24 (except for the 23/24 reversal for convenience in pairing with the planes 21, 22) is useful for the links to the background art according to FIGS. 2, 3.

FIG. 6 is a rear perspective view of the rear fixed plane 100 in the inventive solution according to the present invention, which comprises the actuation mechanisms for the movement of the suckers.

FIG. 7 is a view of the constructive details of the actuation mechanisms for the movement of the suckers 101 related to the upper array.

FIGS. 8, 9 and 9a are views of the constructive details of the actuation mechanisms for the movement of the suckers 101 related to the lower rows of suckers.

FIG. 10 is a view of the device of FIG. 5 in a transverse sectional view taken with respect to the plane of the insulating glazing unit 1 and therefore with respect to the known planes: the fixed plane 21, modified to 100 due to the presence of the inventive parts (array of suckers 101), and the movable plane 22, modified to 200 for cooperation with the functions of the fixed plane 100 of the machine, and shows the interaction among the components of the machine, such as the array of suckers 101 (shown partially) and the row of suckers 101 and the system for the conveyance of the glass panes through the perimetric edges 2d during the step in which the non-flat second glass pane 2 is transformed into a flat pane and therefore with the conveyor belt 23 spaced from the edge 2d of the glass pane 2. This figure also indicates the pseudo-vertical axis Y with which the plane 200 is provided (the planes 200a, 200b are provided), in order to perform the configurations of insulating glazing units 1 according to FIGS. 1E-1G, but this belongs to the background art since 1998 and is not relevant.

FIG. 11 is a view of the device of FIG. 5 in a transverse cross-section with respect to the plane of the insulating glazing unit 1 and therefore with respect to the known planes: the fixed plane 21, modified to 100 due to the presence of the inventive parts (array of suckers 101), and the movable plane 22, modified to 200 for cooperation with the functions of the fixed plane 100 of the machine, and shows the interaction among the components of the machine, such as the array of suckers 101 and the row of suckers 101 and the system 300 for the conveyance of the special frame 3s which includes the intermediate glass pane 2s.

Figure 12:
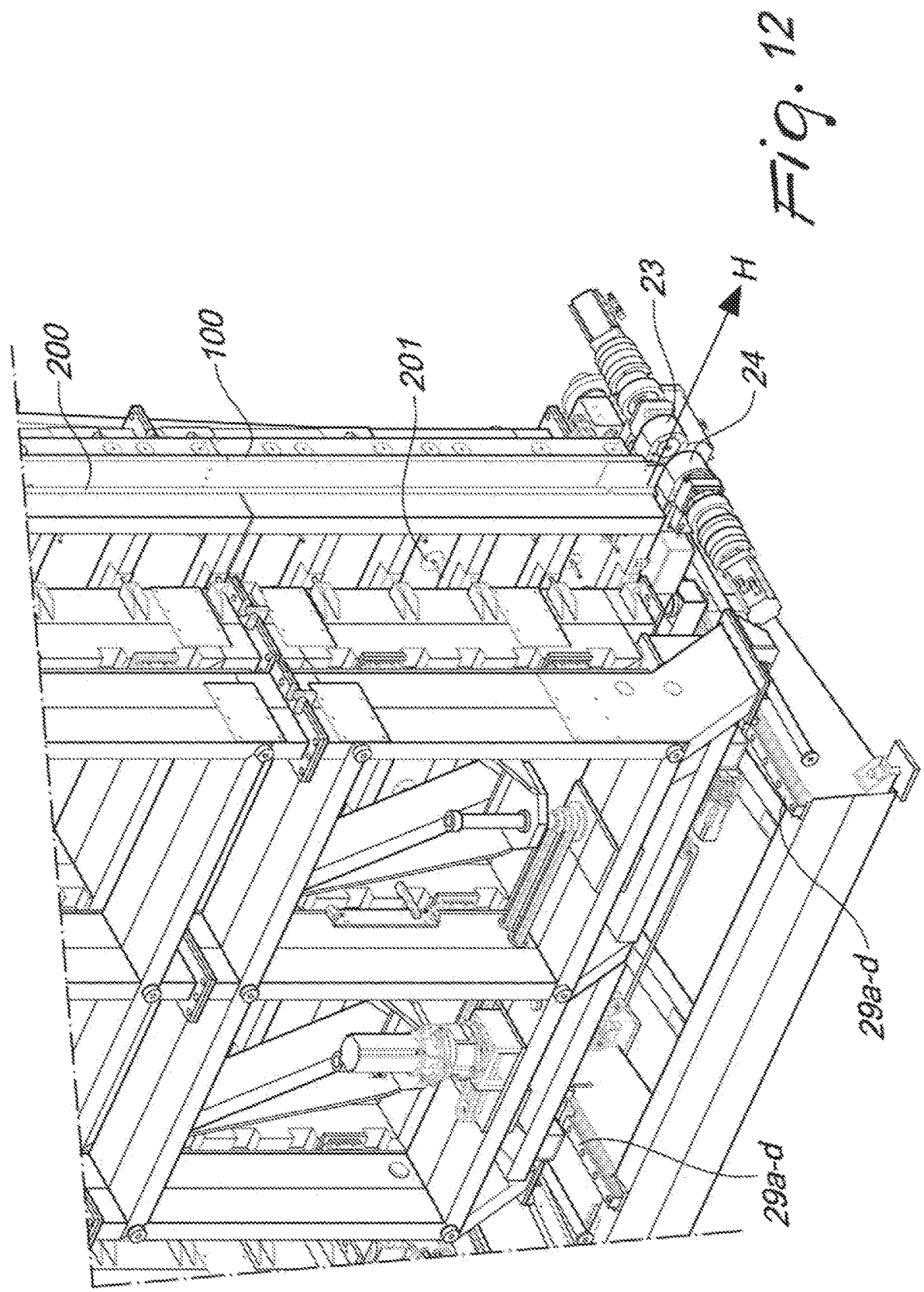
Figure 13:
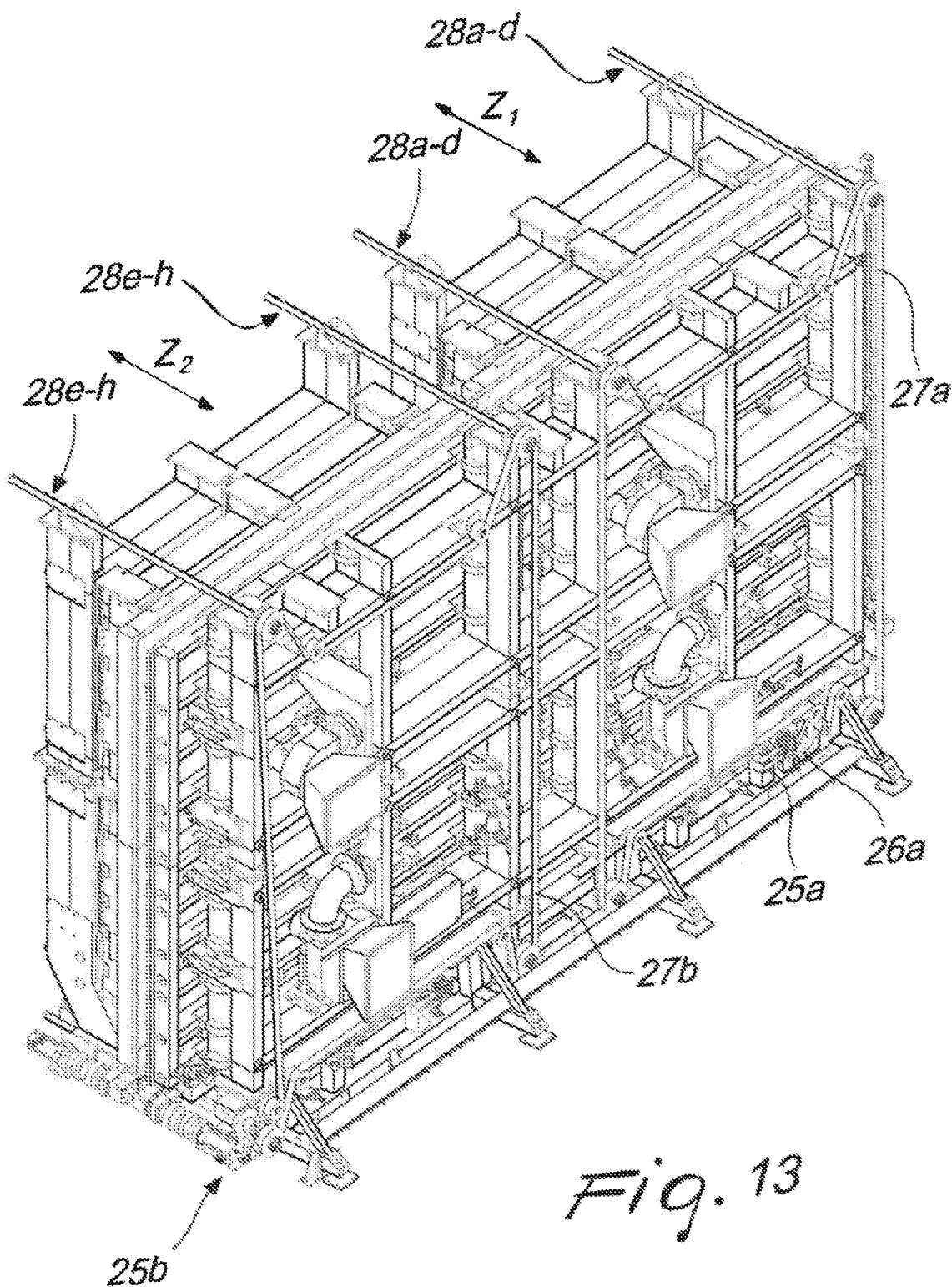

FIGS. 12 and 13 show the complete machine, mainly for its known parts in the main views: respectively a partial perspective front view, with identification of the horizontal axis H of motion of the insulating glazing unit performed by the lower part of the conveyor which is partially of the roller type (in the input and output conveyors, not shown) and partly of the belt type 23, 24 (in the mating device/press/gas filler body); general axonometric lateral/rear view with identification of the transverse axes respectively Z1 and Z2 for the movement of the movable planes 22 (22a, 22b) and Z 11 . . . Z62 for the movement of the formation of suckers 101 of the fixed plane 100; in particular, the rear view shows the known mechanisms for the movement of the movable planes 22 with respect to the fixed plane 100 along the axes Z1 and Z2, which consist of the synchronous motors 25a,b, the guiding transmission 26a,b, the main transmission 27a, b, and the screw/ballscrew assemblies 28a-h, and, in the front view, the pairs of guides 29a-d for supporting the movable plane, which has in any case the known role of mating and pressing, preceded by the straightening operation, by compression against the fixed plane 100, the first glass pane 2 and of keeping it flat by means of the formation of suckers 201.

Figure 14:
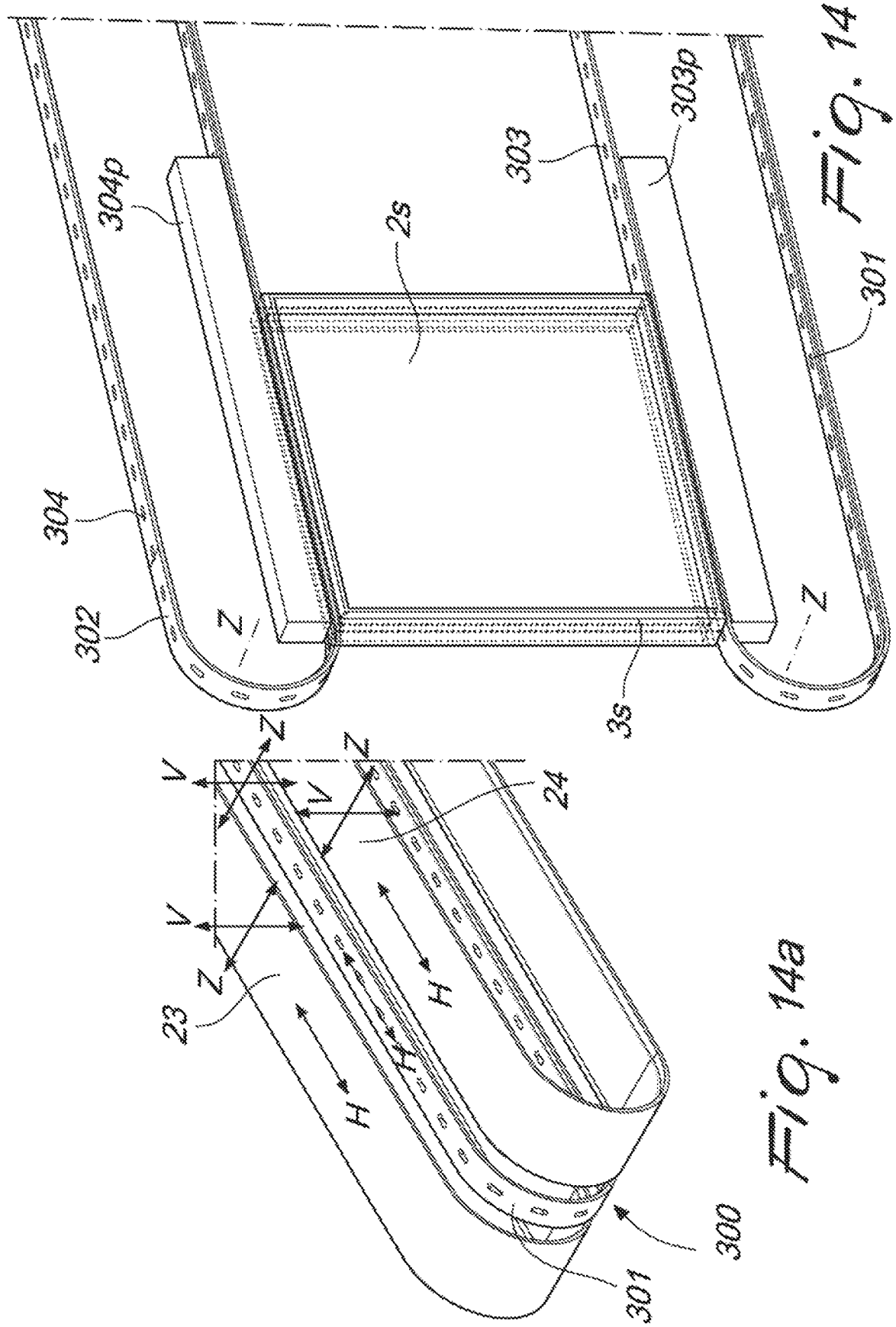
Figure 15:
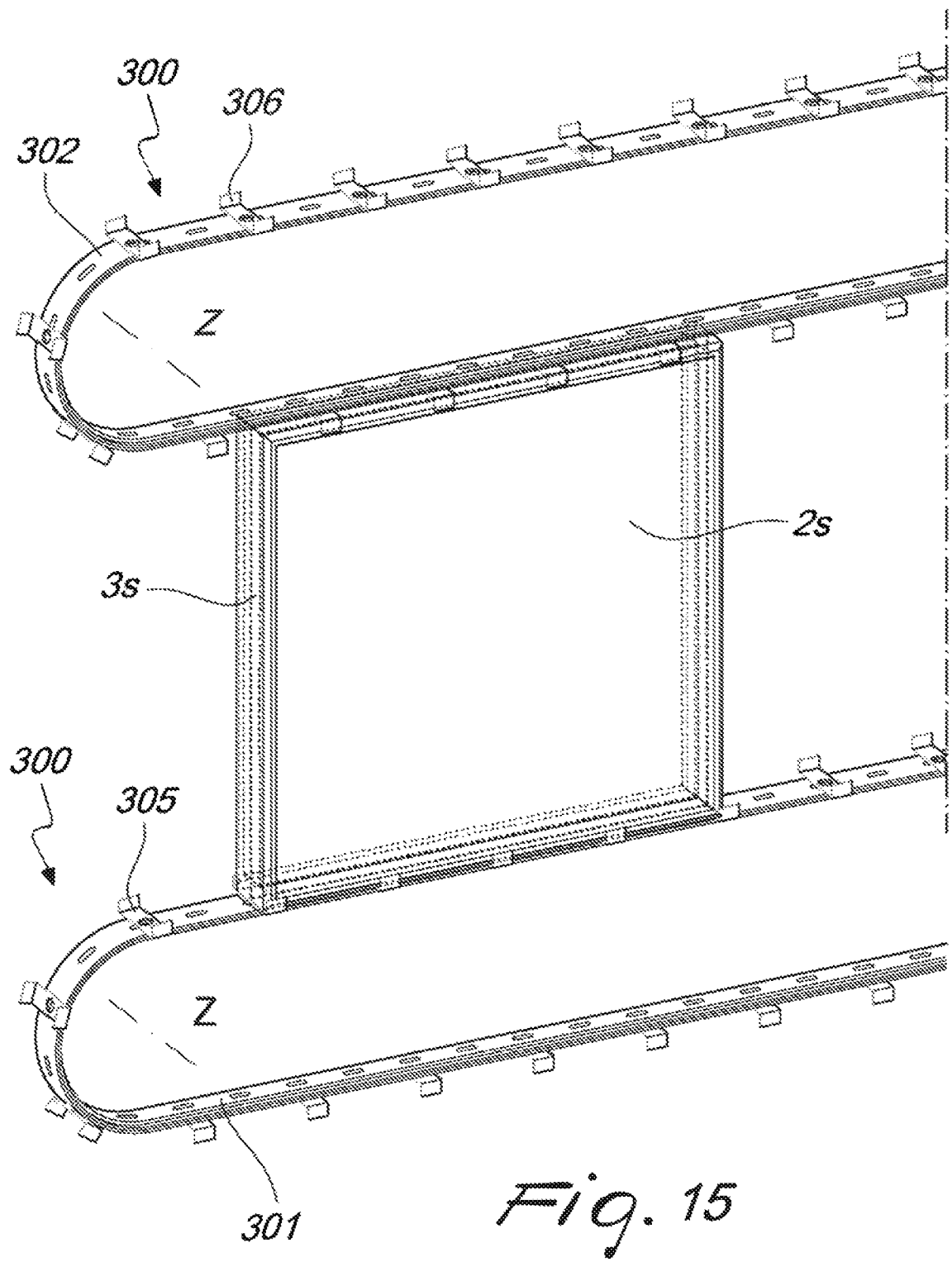

FIGS. 14, 14a and 15 show the situation of rendering the external glass panes completely flat, and consist of the possibility to process insulating glazing units with special compositions, such, by way of nonlimiting example, the one shown in FIG. 1J.

Figure 16:
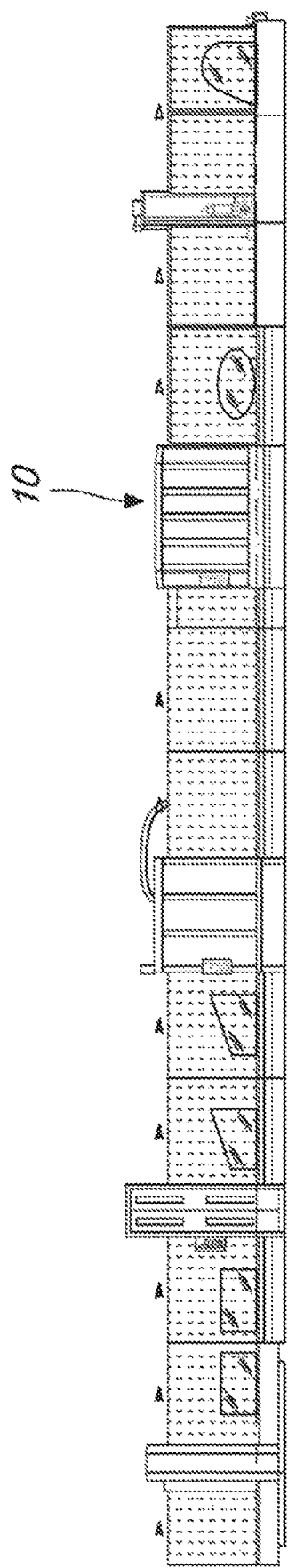
Figure 16D:
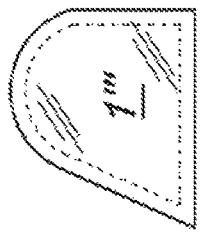
Figure 16C:
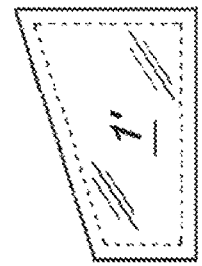
Figure 16B:
Figure 16A:
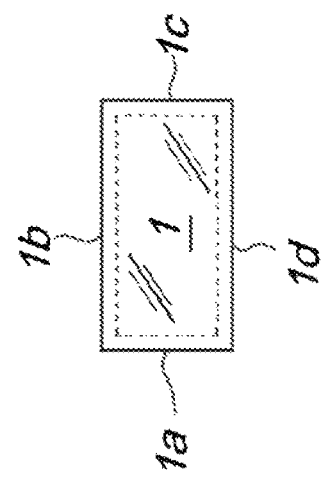

FIG. 16 is a view of an example of insertion of the devices according to the present invention and of the mating/press/automatic gas filler machine 10 in the production line of the insulating glazing unit 1 (perspective view which does not comprise: the electrical/electronic panel, the control post and the protection devices).

Figure 17:
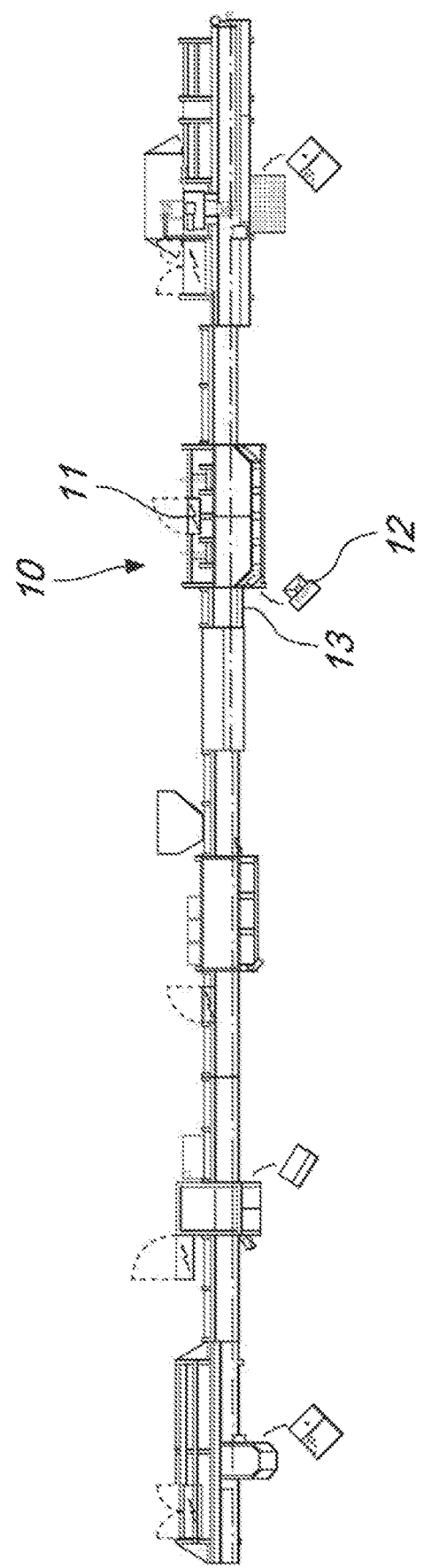

FIG. 17 is a view of an example of insertion of the devices according to the present invention and of the mating/press/automatic gas filler machine 10 in the line for the production of the insulating glazing unit 1 (plan view which includes: electrical/electronic panel 11, control post 12 and protection devices, designated generally by 13, both of the type of mechanical barriers or optical barriers or laser barriers or electrosensitive mats etc., since particular attention is dedicated not only to the functional, qualitative and production aspects that are typical of the content of this invention but also to the aspects related to accident prevention).

The electrical panel 11 and the post 12 differ from the ones according to the background art in the implementation of all the commands and controls required for the operation of the inventive devices of the series 100 according to the present application.

The criterion adopted in numbering is the following.

The products, the insulating glazing unit 1, the glass pane 2, the spacer frame 3, etc. for the other components, are identified by single-digit numerals. In particular, in order to distinguish the various possible shapes of the insulating glazing unit 1, the numeral 1 designates the most frequent situation (rectangular), the numeral 1' designates the polygonal shape, the numeral 1" designates the curvilinear shape, although it cannot be processed in the machine according to the present invention, and the numeral 1''' designates the mixed shape.

The known components of the mating device/press/gas filler machine 10 are typically those of the prior art EP 2 093 370 B1, and are identified by two-digit numerals and are not all consecutive in order to distribute them as fields of tens.

The main components of the inventive devices are collected in the series 100 mainly and in the series 300 secondarily and have three-digit numerals, wherein the value with two zeros is reserved for the assembly.

DESCRIPTION OF THE PREFERRED EMBODIMENTS

A premise related to orientations must be kept in mind: when the term "vertical" has been used and will be used, it was understood and it will be understood as slightly inclined with respect to the vertical; in fact, the conveyance of the insulating glazing unit 1 occurs on conveyors the resting plane of which is inclined by approximately 6 degrees with respect to the vertical plane, and likewise the rollers or other lower support/conveyance elements, by having the axis inclined by approximately 6 degrees with respect to the horizontal plane, when the term "horizontal" has been used and will be used, it was understood and will be understood as slightly inclined with respect to the horizontal.

Initially, the known part of the mating device/press/gas filler machine (hereinafter sometimes simplified by the term "press" alone), i.e., the one that according to the prior art of EP 2 093 370 B1 (to which reference is made for the details not described herein) leads to filling with gas, to mating and to pressing of the components of the insulating glazing unit 1, with straightening (flattening) of the entire glass pane 2 on the movable plane and at the most with the straightening of only the base of the glass pane 2 on the fixed plane, is described in summary. This is done by presenting, albeit with reference to the configuration of the machine 10 according to the present invention, the sequence of the steps of the processing cycle, in detail for the case of a double insulated glazing unit, i.e., constituted by two glass panes 2 and by a spacer frame 3.

The first of the two glass panes 2 that arrives from the previous processes performed in the vertical line for the production of the insulating glazing unit, assumed to be known according to the most pertinent prior art EP 2 093 370 B1, conveyed by conveyors that have a vertical arrangement (actually inclined by approximately 6 degrees) enters the press body, where it is supported and conveyed by the horizontal belt conveyor 24 and is rested against the fixed plane with a vertical arrangement (actually inclined by approximately 6 degrees) 21, generally and widely provided with a plurality of holes 31 which convey air so that sliding against the plane 21 is facilitated by an air cushion. Known slowing sensors 122 and stopping sensors 123 act on the motor that actuates advancement and position the glass pane in a specific point of the plane 21, as visible in FIG. 2 or in FIG. 3, although the latter refers to the second glass pane.

At the end of this step, the movable plane 22 [in the present invention divided into two sections (22a, 22b) for the sake of greater flexibility with respect to the dimensions of the glass panes and accordingly of the insulating glazing units to be processed, but this is irrelevant and therefore one shall continue to reference equally the movable plane or the movable planes] that was sufficiently distant from the fixed plane 21 to allow indeed the entry of the first glass pane 2, by virtue of the action of the motor 25 (25a, 25b), of the mechanical transmissions 26 (26a, 26b) and 27 (27a, 27b) and of the ballscrews 28a-d and 28e-h, closes against the fixed plane 21, until the glass pane 2, which is often non-flat, is flattened, since in this condition the function of the fixed and movable planes is to press individually the first glass pane, and by virtue of the partial vacuum activated on the suckers distributed on the movable plane 22 the first glass pane 2 is captured and retained by the same movable plane 22, which thus moves away from the fixed plane by reverse action of the motor 25 (25a, 25b), thus leaving space for the introduction of the additional components of the insulating glazing unit 1.

At this point, the second glass pane 2, provided with the spacer frame 3, which in turn originates from the preceding processes performed in the vertical line for the production of the insulating glazing unit, conveyed by conveyors with a vertical arrangement, enters the press body, where it is supported and conveyed by the belt conveyor 23 and rested against the vertical fixed plane with air cushion. The slowing and stopping sensors act on the motor that actuates the advancement and position this glass pane as well in the same point where the previous one had stopped.

In the case of EP 2 093 370 B1, the suckers 101a-g intervene which, with a first stroke for approach toward said second glass pane, mate with the respective rear face, establishing a coupling therewith by means of the actuation of vacuum, and then with an opposite spacing stroke straighten the lower flap 2d, making it adhere to the fixed plane 21, but in this background art with the drawback of scraping the belt 23 of the conveyor.

Then the movable plane 22 and the glass pane 2 previously captured with it, again by actuation of the motor 25 (25a, 25b), approaches the fixed plane 21 and moves said glass pane 2 retained by the movable plane 22 to a distance from the spacer frame 3 of a few millimeters; the gas 7 enters through said gap, supplied by a manifold (which optionally can be throttled in its lengthwise extension) provided with a very large number of holes and arranged below the fixed and movable planes. Sealing systems known from the previously described background art (there being many solutions) close both the lower edge 1d, leaving it connected to the manifold alone, and optionally the lateral edges 1a and 1c of the components of the insulating glazing unit. During the inflow of the gas 7, the horizontal upper side 1b remains theoretically open to vent the air.

Once the introduction of the gas 7 has ended, the movable plane 22, again by virtue of the actuation of the motor 25 (25a, 25b), moves the glass pane 2 that it retains closer to the spacer frame 3 that belongs to the opposite glass pane, mating them and pressing them with such a pressure value as to ensure the spreading of the butyl sealant 5 between the frame 3 and the glass panes 2, so as to achieve the sealing of the inner space of the insulating glazing unit 1, with respect to the outflow of the gas 7 that has just been introduced and with respect to the entry of humidity and this occurs throughout the life of the insulating glazing unit 1, which is typically guaranteed for 10 years.

The method can be repeated by adding another glass pane 2 provided with a spacer frame 3, in order to obtain the insulating glazing unit with two inner spaces, and so forth.

We now move on to the detailed description of an embodiment of the inventive part of the present invention, i.e. (first part), the one which, paired with the traditional part described above, is capable of filling the insulating glazing unit 1 with gas 7 in an innovative manner with respect to the background art and furthermore (second part) allows the composition of the insulating glazing unit with the use of special spacer frames 3s.

A preferred way of carrying out the invention (first part) is the one described hereinafter; for easy comprehension it is convenient to follow in a parallel manner the figures, in particular FIGS. 4 to 15, related to the inventive concept.

Previously the description of the known part, both of the machine 10 and of the method, closer to the content of the present invention, on which known part now the inventive part is superimposed, which is manifested as a particular integration of suckers on the fixed plane 21 (now 100) and their particular activation logic.

Starting from the method, this is the succession of the steps, from the arrival of the second glass pane 2 provided with a spacer frame 3, which involve the formations of suckers distributed on the fixed plane 21 (now 100), in rows in the base region, in an array in the upper region.

After the stopping of the glass pane, both the first formation (row) of suckers arranged at the base and the second formation (array) of suckers arranged upward, all at first in a retracted position with respect to the plane 100, are moved transversely to the plane 100 toward the glass pane, making contact with it, in the discrete quantity that corresponds with the surface of the glass pane, then vacuum is activated; in this situation, the glass pane is supported, so as to contrast the force of gravity, by the set of suckers involved and therefore the underlying conveyor belt 23 can be lowered; then the entire set of suckers is moved in the opposite direction until the active face 101f is exactly aligned with the fixed plane 100, thus achieving the perfect flattening of said glass pane, without said pane having encountered resistance toward the conveyor belt 23, which in the meantime has been lowered and optionally moved transversely.

This method is performed by means of the mechatronic and pneumatic mechanisms described hereinafter.

For the upper sucker array: in sequence starting from the suckers 101: the brackets 102; the bars 103a, 103b; the sleeves 104a, 104b; the racks 105; the pinions 106, the keying elements 107; the shafts 108; these components being coupled by hinges or by sliding in the supports 109 provided with bearings 110; the keying elements 111; the arms 112; the pneumatic cylinders connected in series 113, 114 coupled by hinges to the pivots 115 of the plates 116. These pneumatic cylinders 113, 114 are actuated according to the following combinations: both at the negative stroke end for the disappearance of the suckers 101 behind the face of the fixed plane 100, so that the glass pane can pass while resting on said plane with air cushion separation; both at the positive stroke end for a protrusion of the suckers 101 with respect to the face of the fixed plane 100 such that the lip of said suckers rests on the face of the glass pane in the condition of maximum camber thereof, a condition after which vacuum is activated on said suckers; one at the positive stroke end and the other at the negative stroke end for precise alignment of the load-bearing face 101f of the suckers 101, i.e., the one with flat impressions, with the face of the fixed plane 100.

One refinement to avoid, in the condition of maximum protrusion of the suckers 101 with respect to the plane 100, that said suckers can act toward the glass pane with overturning thrusts, is to actuate the pneumatic cylinders 113, 114 with a pressure that is reduced by means of pressure regulators so that the component of the action of gravity of the glass pane against the suckers (10% of the weight of the glass pane for the classic inclination of the conveyors by 6 degree) is greater than the thrust applied by the suckers by means of said pneumatic cylinders and subsequent mechanisms.

For the base sucker rows: in sequence starting from the suckers 101: sucker supporting stem 117; connector 118 for the vacuum circuit; guiding bushing 119; pneumatic cylinder 120; cylinder-stem connection 121. In FIGS. 8, 9 and 9a it is possible to notice different sizes of these components since the base suckers, as can be seen in FIG. 4, can have different diameters in order to cover the situations of small glass panes.

The concept of related actuation with reduced pressure described earlier applies also to the suckers of the base rows and indeed this pressure adjustment can be performed for each individual sucker and therefore even more effectively to avoid relative displacements between the glass pane 2 and the belt 23.

Differently from the upper sucker array, in the base sucker rows, in the idle return stroke the lip of the suckers 101 is aligned with the plane 100 and therefore the flat face 101f thereof is more recessed. Thus during the step of straightening the base region of the glass pane 2 the pneumatic cylinders 120 do not reach their stroke limit and maintain traction toward the glass pane 2, the straightening action at the base requiring greater force against the plane 100.

The situation of having rendered geometrically flat the glass panes, respectively the first pane 2 mated with the movable plane 200, the second pane 2 provided with the spacer frame 3 mated with the fixed plane 100, entails the possibility to adjust precisely and uniformly the perimetric gap, which has the following important functionalities:

- to be reduced to a minimum, since it entails an increase of the volume to be invaded with the gas and this increase then disappears during the mating and pressing step, with consequent waste of gas, and therefore a gap of around 1.5÷2 mm is the ideal one; in fact, the residual volume when the insulating glazing unit is finished is the one that corresponds to the area of the glass pane 2 multiplied by the thickness of the spacer frame 3 and not by the thickness of the spacer frame plus 2 millimeters (or more, at least 5 millimeters in the background art other than EP 2 093 370 B1 required in order to compensate the non-flatness of the glass panes).
- to allow the base a uniform and laminar distribution of the gas that arrives from the underlying manifolds;
- to have no effect on the lateral bands, even to the point of constituting a load loss that is sufficient to limit the lateral escape of the gas prior to mating, to the point, in some situations, of not having to resort to lateral sealing gaskets or at least of avoiding one of them, in particular the one that can move on the front of the insulating glazing unit, which is the most complex one in terms of mechanisms;
- to provide uniform venting for the air in an upward direction during the step of replacement with the gas;

and, not secondarily (second part), as described hereinafter in correlation with this paragraph, the situation of having rendered geometrically flat the glass panes, respectively the first pane 2 since it is effectively mated with the movable plane 200 (200*a*, 200*b*), the second one 2 since it is mated with the fixed plane 100, now inserted in the press body of the machine 10 without the spacer frame 3, entails the advantage of processing innovative spacer frames 3*s*, the details of which cannot be disclosed in their entirety in this step since they are protected by confidentiality agreements with their manufacturer, although they can be revealed in their general aspects that are already public and are sufficient to exhaustively support the related independent device and method claims according to the following description of some embodiments.

These are the configurations shown in FIGS. 14, 14*a* and 15, which use the devices 300 for the insertion and positioning of said special frames 3*s*, which generally embed at least one glass pane 2*s* or at least one ornamental grille of which they constitute the border, as components which are prefabricated in machines which are external with respect to the production line of the insulating glazing unit 1 and merge into said line upstream of the machine 10 according to the present invention.

Substantially the devices 300, in terms of mechanisms, are similar to the ones according to the background art 23, 24, i.e., provided with longitudinal movement along the axis H and with vertical adjustment along the axis V and transverse adjustment along the axis Z, like the known devices 23, 24.

They are essentially constituted by conveyor belts, 301 the lower one, 302 the upper one, which insert the special frame 3*s* during the operating cycle of the press, in a centered position with respect to the mutually opposite glass panes 2, in this case both not being provided with a spacer frame 3, and so as to leave the gaps (between the frame and the glass panes, and therefore two) described previously of approximately 2 mm, in the condition in which said glass panes 2 are supported by means of the action of the suckers 201 belonging to the movable plane 200 and 101 belonging to the fixed plane 100, the devices 23, 24 can be moved away in order to free the region below the lower flaps 2*d* of the glass panes 2.

The injection of the gas can then be performed simultaneously in the two inner spaces that have formed between the intermediate glass pane 2*s* and the mutually opposite panes 2, obtaining moreover a considerable reduction of cycle time.

The device constituted by the upper conveyor belt 302, during the steps of the mating and pressing cycle, disappears upward by virtue of its adjustability according to the axis V, while the device constituted by the lower conveyor belt 301 disappears downward by virtue of its adjustability along the axis V only after mating, since it must bear the weight of the special frame 3*s* and of the intermediate glass panes 2*s*, if any, and of the ornamental grilles, if any.

It goes without saying that these devices 301, 302 must have a transverse space occupation that is smaller than the width of the special frame 3*s*, but as can be noticed from the proportions of FIG. 1J, said special frames 3*s*, in view of their functions, always have a considerable space occupation.

The solutions for retaining said special frame 3*s* both during longitudinal movement and for transverse centering with respect to the mutually opposite glass panes 2 can be solved with slits 303, 304 in the conveyor belts 301, 302 which communicate with manifolds 303*p*, 304*p* arranged in the respective inner curves which have the function of a plenum in partial vacuum, or with small C-shaped supports 305, 306, which however in this second case are complementary, in terms of transverse dimensions, with the shape and width of said special frames 3*s*. The second situation is more reliable than the first one in terms of centering with respect to the mutually opposite glass panes 2 but it is less flexible, since said C-shaped supports 305, 306 must be replaced as a function of the width of the special frame 3*s* (although, in the current state, there is no critical variability regarding the shape and dimensions of the transverse cross-section of said special frames 3*s*).

The solutions for the adjustments of the devices 301, 302 according to the axes V and Z do not need to be described here since they belong to the cited background art both of the proprietor of the present application and of others.

A likewise frequent composition of a special spacer frame 3*s* can relate to the condition in which, instead of surrounding a glass pane 2*s* (or multiple glass panes 2*s*) or one or more ornamental grilles, it surrounds both one or more glass panes 2*s* and one or more ornamental grilles.

In the case of an insulating glazing unit 1 having a contoured shape, i.e., a shape other than rectangular (see FIG. 16), the information to the machine 10 regarding its shape is inserted electronically with known methods (via keyboard, floppy disk, USB memories, or network) or with innovative but not inventive methods such as detection by means of a scanner. These contoured shapes must be inserted since the process logic of the machine must know them in order to stop the glass panes, along the direction H, in a consequent position, and to calculate the volume of gas to be injected, which is based both on the surface of the glass panes and on the width of the spacer frame, all according to known methods.

Of course, all the movements linked to the steps of the cycle are mutually interlocked, with the aid of a logic system which is parallel but always active, in order to avoid, during the process, conditions of mutual interference between the actuation elements and the material being processed.

The present invention is susceptible of numerous constructive variations (with respect to what can be deduced from the drawings, the details of which are evident and eloquent), all of which are within the scope of the appended claims; thus, for example and in particular, the mechanical solutions for the movement and the adjustments along the axes Z of the movable planes 200 (200*a*, 200*b*) and of the suckers 101, the actuation means, which can be electrical, electrical-electronic, pneumatic, hydraulic and/or combined, etc., the control means, which can be electronic or fluidic and/or combined, etc.

The constructive details can be replaced with other technically equivalent ones. The materials and the dimensions may any according to the requirements in particular arising from the dimensions (base and height) and/or from the shape of the insulating glazing unit 1, in constant devolution, considering that already today the range of dimensions varies from minimum values of approximately 300 mm×200 mm to the maximum values of 12000 mm×3300 mm (such as the ones required for Apple Stores) and indeed the larger dimensions require the glass panes 2, in particular being of the laminated or tempered or combined laminated-tempered type, to be rendered flat before the process of flushing the gas or of insertion of special frames.

The description and the figures cited above refer to a mating device/press/gas filling machine 10, which includes the innovative devices and is arranged according to a flow of the process from left to right; it is easy to imagine a description and the corresponding figures in the case of mirror-symmetrical or otherwise different arrangements, which for example include a variation of the direction of the line.

INDUSTRIAL APPLICATION

It goes without saying that the industrial application is of assured success, since machines for the automatic filling of the insulating glazing unit 1 with a gas other than air have developed particularly over the last twenty-five years, so much that the proprietor of the present application has already marketed a few hundred units, in particular refining the execution of the manifolds for the introduction of the gas, according to the teachings of EP 2 093 370 B1, so that the corresponding flow is laminar.

This demand for machines for filling the insulating glazing unit with a gas other than air is still growing exponentially by virtue of the energy-saving technical laws already mentioned, which require resorting to filling the inner space of the insulating glazing unit with a gas other than air, frequently argon but sometimes also krypton and xenon, which are definitely much more expensive (by two orders of magnitude).

Moreover, the composition of insulating glazing units comprising special frames 3s such as the ones that embed one or more intermediate glass panes 2s or one or more ornamental grilles or both is evolving progressively and the present invention anticipates an imminent market demand, which can be met only by rendering the glass panes 2 completely flat in the body of the press 10.

The insertion of the machine that includes the present invention in the production line of the insulating glass frame is shown in FIGS. 16 and 17 (perspective view and plan view), as an evident confirmation of the assured success in industrial application.

The disclosures in Italian Patent Application No. 102017000089359 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. An automatic device for filling with a gas other than air, for mating and pressing of an insulating glazing unit composed of at least two glass panes, which are typically not precise in terms of flatness, and at least one spacer frame, the automatic device comprising:
   at least one input conveyor and at least one output conveyor which support and convey the components of the insulating glazing unit with an arrangement that is slightly inclined with respect to the vertical along a longitudinal axis which is parallel to a base of the insulating glazing unit, and
   a body comprising
      a fixed plane constituting an extension of said conveyors and is in turn provided with support and conveyance means, and
      at least one movable plane parallel to the fixed plane, in turn provided with support and conveyance means and adapted to capture a glass pane of the at least two glass panes by a formation of suckers and to keep said glass pane at an appropriate distance from a subsequent glass pane of the at least two glass panes provided with a spacer frame during injection of a gas fed by a perforated manifold which optionally is throttled in its longitudinal extension and is arranged along the lower side of the insulating glazing unit,
      wherein said fixed plane is provided with formations of retractable suckers arranged along the entire surface of the fixed plane, the retractable suckers suitable to move transversely to contact said subsequent glass pane and to retract while supporting the subsequent glass pane to flatten the entire surface of said subsequent glass pane, when retracted, the flat active faces of said retractable suckers being aligned with the face of the fixed plane or in a slightly retracted position with respect to said fixed plane, wherein when the formation of suckers of said fixed plane capture the glass pane, the support and conveyance means is lowered;
      wherein, in the automatic device, the at least two glass panes are geometrically flat during filling with the gas other than air such that an upper gap is maintained for venting of air.

2. The device according to claim 1, further configured to receive a third glass pane of the at least two glass panes, when the insulating glazing unit is constituted by three glass panes and two spacer frames, the retractable suckers suitable to move transversely to contact said third glass pane with flat active faces of the retractable suckers and suitable to retract the retractable suckers to flatten the entire surface of said third glass pane.

3. The device according to claim 1, wherein mechanisms for the movement of a row of suckers along an axis Z which are perpendicular to the planes are actuated by one or by a plurality of pneumatic actuators.

4. The device according to claim 1, wherein the support of the suckers loaded by the action of the weight of said subsequent glass panes provided with spacer frame is entrusted to stems and to bars and to sleeves which are arranged along an axis Z which is perpendicular to the fixed plane.

5. The device according to claim 1, further configured to receive an n-th glass pane of the at least two glass panes when the insulating glazing unit is constituted by n glass panes, the retractable suckers suitable to move transversely to contact each subsequent glass pane of the n glass panes with flat active faces of the retractable suckers and suitable to retract the retractable suckers to flatten the entire surface of each subsequent glass pane of the n glass panes.

6. The device according to claim 1, wherein the formations of retractable suckers arranged along the entire surface of the fixed plane comprises a first formation being a lower row of retractable suckers arranged at a base of the fixed plane and a second formation being an array of retractable suckers positioned upward of the base of the fixed plane.

7. The device according to claim 6, wherein the lower row of retractable suckers arranged at the base of the fixed plane are configured to retract to a different position relative to the fixed plane than the array of retractable suckers.

* * * * *